(12) United States Patent
Seay et al.

(10) Patent No.: US 9,410,618 B2
(45) Date of Patent: Aug. 9, 2016

(54) ADAPTIVE SHIFT SCHEDULING SYSTEM

(71) Applicant: International Engine Intellectual Property Company, LLC, Lisle, IL (US)

(72) Inventors: Andrew Thomas Seay, Lake Forest, IL (US); Michael Padowski, Des Plaines, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 64 days.

(21) Appl. No.: 14/183,690

(22) Filed: Feb. 19, 2014

(65) Prior Publication Data

US 2015/0233470 A1 Aug. 20, 2015

(51) Int. Cl.
*G06F 7/00* (2006.01)
*F16H 61/02* (2006.01)

(52) U.S. Cl.
CPC .... *F16H 61/0213* (2013.01); *F16H 2061/0216* (2013.01); *F16H 2061/0223* (2013.01)

(58) Field of Classification Search
CPC ............... F16H 61/10; F16H 61/0213; F16H 2061/0223; F16H 2061/0216
See application file for complete search history.

(56) References Cited

U.S. PATENT DOCUMENTS

| 5,097,725 | A   | * | 3/1992  | Sawa     | F16H 61/0213 477/129 |
| 5,591,102 | A   | * | 1/1997  | White    | B60W 10/11 477/107 |
| 5,788,601 | A   | * | 8/1998  | Kuriyama | F16H 61/0213 477/71 |
| 7,578,766 | B2  | * | 8/2009  | Watanabe | F16H 61/0213 477/107 |
| 8,052,573 | B2  | * | 11/2011 | Honma    | F16D 48/06 477/120 |
| 8,401,749 | B2  | * | 3/2013  | Ideshio  | F16H 61/0213 477/15 |
| 8,992,382 | B2  | * | 3/2015  | Matsuo   | F16H 61/0213 477/115 |
| 2008/0119327 | A1 | * | 5/2008 | Kitaori  | F16H 61/0213 477/120 |
| 2009/0248233 | A1 | * | 10/2009 | Yamada  | F16H 61/12 701/31.4 |

* cited by examiner

Primary Examiner — David J Hlavka
(74) Attorney, Agent, or Firm — Jack D. Nimz; Jeffrey P. Calfa

(57) ABSTRACT

A method of generating shift schedules for a vehicle having a transmission with a plurality of gears includes providing a plurality of a transmission operational modes categorized by ratios of available traction power after a transmission gear shift compared to available traction power before the transmission gear shift. Based on the list of available traction power the available traction power is determined for each of the plurality of gears over a range of engine speeds. This includes adjusting for parasitic losses and dynamic de-rate conditions at each engine speed datum point. Shift schedules are generated for shifts between gears of the transmission for at least a first transmission operational mode in terms of ratios of available traction power before and after gear shifts.

11 Claims, 12 Drawing Sheets

| | A | B | C | D | E | F | G | H |
|---|---|---|---|---|---|---|---|---|
| 1 | EngPrt_trqLim_CUR | W | Power | Torque(Nm) | | n | Torque(Nm) | Power(hp) |
| 2 | 600 | 1024 | 86 | 1024 | | 600 | 1024 | 86 |
| 3 | 700 | 1162 | 114 | 1025.38 | | 601 | 1025 | 86 |
| 4 | 800 | 1300 | 146 | 1026.76 | | 602 | 1026 | 86 |
| 5 | 900 | 1881 | 237 | 1028.14 | | 603 | 1028 | 87 |
| 6 | 1000 | 2305 | 323 | 1029.52 | | 604 | 1029 | 87 |
| 7 | 1100 | 2305 | 356 | 1030.9 | | 605 | 1030 | 87 |
| 8 | 1200 | 2305 | 388 | 1032.28 | | 606 | 1032 | 87 |
| 9 | 1300 | 2278 | 416 | 1033.66 | | 607 | 1033 | 88 |
| 10 | 1400 | 2237 | 440 | 1035.04 | | 608 | 1035 | 88 |
| 11 | 1500 | 2196 | 463 | 1036.42 | | 609 | 1036 | 88 |
| 12 | 1600 | 2104 | 473 | 1037.8 | | 610 | 1037 | 88 |
| 13 | 1700 | 1990 | 475 | 1039.18 | | 611 | 1039 | 89 |
| 14 | 1800 | 1900 | 480 | 1040.56 | | 612 | 1040 | 89 |
| 15 | 1850 | 1857 | 482 | 1041.94 | | 613 | 1041 | 89 |
| 16 | 1900 | 1735 | 463 | 1043.32 | | 614 | 1043 | 90 |
| 17 | 2000 | 1532 | 430 | 1044.7 | | 615 | 1044 | 90 |
| 18 | 2100 | 1329 | 392 | 1046.08 | | 616 | 1046 | 90 |
| 19 | 2150 | 664 | 200 | 1047.46 | | 617 | 1047 | 90 |
| 20 | 2200 | 664 | 205 | 1048.84 | | 618 | 1048 | 91 |
| 21 | 2300 | 664 | 214 | 1050.22 | | 619 | 1050 | 91 |
| 22 | | | | 1051.6 | | 620 | 1051 | 91 |
| 23 | | | | 1052.98 | | 621 | 1052 | 91 |
| 24 | | | | 1054.36 | | 622 | 1054 | 92 |
| 25 | | | | 1055.74 | | 623 | 1055 | 92 |
| 26 | | | | 1057.12 | | 624 | 1057 | 92 |
| 27 | | | | 1058.5 | | 625 | 1058 | 92 |
| 28 | | | | 1059.88 | | 626 | 1059 | 93 |
| 29 | | | | 1061.26 | | 627 | 1061 | 93 |
| 30 | | | | 1062.64 | | 628 | 1062 | 93 |
| 31 | | | | 1064.02 | | 629 | 1064 | 94 |
| 32 | | | | 1065.4 | | 630 | 1065 | 94 |
| 33 | | | | 1066.78 | | 631 | 1066 | 94 |
| 34 | | | | 1068.16 | | 632 | 1068 | 94 |
| 35 | | | | 1069.54 | | 633 | 1069 | 95 |
| 36 | | | | 1070.92 | | 634 | 1070 | 95 |
| 37 | | | | 1072.3 | | 635 | 1072 | 95 |
| 38 | | | | 1073.68 | | 636 | 1073 | 95 |
| 39 | | | | 1075.06 | | 637 | 1075 | 96 |

FIG. 8

| AQ | AR | AS | At | AU | AV | AW | AX | AY | AZ | BA | BB | BC |
|---|---|---|---|---|---|---|---|---|---|---|---|---|
| 482 | Rated Power | | | | | | | | | | | |
| 2305 | Rated Torque(Nm) | | | | | | | | | | | |
| 1700 | Rated Torque(lbft) | | | | | | | | | | | |

⇒
| 1.00 Performance | | | | | | | | | | | | |
|---|---|---|---|---|---|---|---|---|---|---|---|---|
| | 1 to 2 | 2 to 3 | 3 to 4 | 4 to 5 | 5 to 6 | 6 to 7 | 7 to 8 | 8 to 9 | 9 to 10 | 10 to 11 | 11 to 12 | 12 to 13 |
| Before shift n | 2032 | 1999 | 1964 | 1951 | 1942 | 1961 | 1942 | 1950 | 1945 | #N/A | #N/A | #N/A |
| Before shift hp | 419 | 431 | 443 | 447 | 450 | 444 | 450 | 447 | 449 | #N/A | #N/A | #N/A |
| After shift n | 1315 | 1362 | 1416 | 1433 | 1445 | 1418 | 1443 | 1434 | 1439 | #N/A | #N/A | #N/A |
| Before shift hp | 419 | 431 | 443 | 447 | 450 | 444 | 450 | 447 | 449 | #N/A | #N/A | #N/A |
| Power ratio | 1.00 | 1.00 | 1.00 | 1.00 | 1.00 | 1.00 | 1.00 | 1.00 | 1.00 | #N/A | #N/A | #N/A |

⇒
| 0.95 Standard | | | | | | | | | | | | |
|---|---|---|---|---|---|---|---|---|---|---|---|---|
| | 1 to 2 | 2 to 3 | 3 to 4 | 4 to 5 | 5 to 6 | 6 to 7 | 7 to 8 | 8 to 9 | 9 to 10 | 10 to 11 | 11 to 12 | 12 to 13 |
| Before shift n | 1990 | 1955 | 1917 | 1900 | 1893 | 1913 | 1895 | 1900 | 1897 | #N/A | #N/A | #N/A |
| Before shift hp | 434 | 446 | 458 | 463 | 466 | 459 | 465 | 463 | 464 | #N/A | #N/A | #N/A |
| After shift n | 1287 | 1332 | 1383 | 1395 | 1409 | 1384 | 1408 | 1397 | 1404 | #N/A | #N/A | #N/A |
| Before shift hp | 412 | 423 | 435 | 439 | 441 | 436 | 441 | 439 | 440 | #N/A | #N/A | #N/A |
| Power ratio | 0.95 | 0.95 | 0.95 | 0.95 | 0.95 | 0.95 | 0.95 | 0.95 | 0.95 | #N/A | #N/A | #N/A |

⇒
| 0.85 Economy | | | | | | | | | | | | |
|---|---|---|---|---|---|---|---|---|---|---|---|---|
| | 1 to 2 | 2 to 3 | 3 to 4 | 4 to 5 | 5 to 6 | 6 to 7 | 7 to 8 | 8 to 9 | 9 to 10 | 10 to 11 | 11 to 12 | 12 to 13 |
| Before shift n | 1895 | 1859 | 1756 | 1714 | 1687 | 1751 | 1690 | 1712 | 1697 | #N/A | #N/A | #N/A |
| Before shift hp | 465 | 479 | 478 | 476 | 475 | 478 | 475 | 476 | 475 | #N/A | #N/A | #N/A |
| After shift n | 1226 | 1267 | 1266 | 1259 | 1255 | 1267 | 1256 | 1259 | 1256 | #N/A | #N/A | #N/A |
| Before shift hp | 395 | 406 | 406 | 404 | 403 | 406 | 403 | 404 | 403 | #N/A | #N/A | #N/A |
| Power ratio | 0.85 | 0.85 | 0.85 | 0.85 | 0.85 | 0.85 | 0.85 | 0.85 | 0.85 | #N/A | #N/A | #N/A |

⇒
| 1.05 Hill Climb | | | | | | | | | | | | |
|---|---|---|---|---|---|---|---|---|---|---|---|---|
| | 1 to 2 | 2 to 3 | 3 to 4 | 4 to 5 | 5 to 6 | 6 to 7 | 7 to 8 | 8 to 9 | 9 to 10 | 10 to 11 | 11 to 12 | 12 to 13 |
| Before shift n | 2067 | 2036 | 2004 | 1993 | 1984 | 2001 | 1984 | 1992 | 1987 | #N/A | #N/A | #N/A |
| Before shift hp | 405 | 417 | 429 | 433 | 436 | 430 | 436 | 433 | 435 | #N/A | #N/A | #N/A |
| After shift n | 1337 | 1388 | 1445 | 1464 | 1476 | 1447 | 1474 | 1465 | 1470 | #N/A | #N/A | #N/A |
| Before shift hp | 425 | 437 | 450 | 454 | 457 | 450 | 457 | 454 | 456 | #N/A | #N/A | #N/A |
| Power ratio | 1.05 | 1.05 | 1.05 | 1.05 | 1.05 | 1.05 | 1.05 | 1.05 | 1.05 | #N/A | #N/A | #N/A |

FIG. 10

ADAPTIVE SHIFT SCHEDULING SYSTEM

BACKGROUND

1. Technical Field

The technical field relates to the operation of motor vehicle transmissions, and in particular, to a method for dynamic adaptation of shift schedules used with automatic transmissions to support diverse performance objectives.

2. Description of the Technical Field

Contemporary motor vehicles typically provide control modules for major vehicle sub-systems and one or more communication channels over which data are exchanged between the control modules. Vehicles having an internal combustion engine and transmission sub-systems are typically provided with an engine controller/engine control unit (ECU) and a transmission control module (TCM). The communication channels are usually a physical data bus such as a twisted wire pair provided as part of a controller area network (CAN). Overall vehicle fuel economy and driving performance has been enhanced by the cooperation in controller operation using networking technology such as CAN.

Conventionally, transmission control software has been installed on the TCM. Transmission control software includes shift control logic (SCL) which has access to a plurality of shift schedules. Shift schedules operate on vehicle operating variables, particularly engine speed and vehicle speed, to select a transmission gear within an allowed range and to control shifting to the selected gear. On vehicles equipped with "automatic manual transmissions," clutch control logic (CCL) implements engagement and disengagement of the transmission clutch(es). The SCL selects a shift schedule based on selected performance objective (for example economy, performance) and a gear ratio from those available according to the shift schedule. The timing of shifts to the selected gear ratio occur in coordination with the CCL whereby the selected gear becomes the achieved gear.

Shift schedules have been supplied by transmission original equipment manufacturers based on base engine performance characteristics. The shift schedules have been particular to a specified vehicle and engine combination on a vehicle.

SUMMARY

A method of generating shift schedules for a vehicle transmission with a plurality of gears includes obtaining transmission operational parameters and determining vehicle operating conditions and providing in response thereto a plurality of shift schedules categorized in terms of ratios of available traction power after a transmission gear shift compared to available traction power before the transmission gear shift. The available traction power is determined for each of the plurality of gears over a range of engine speeds. This determination includes adjusting for parasitic losses at each engine speed datum point. Shift schedules are generated for shifts between gears of the transmission for each of a plurality of exogenously provided transmission operational modes.

BRIEF DESCRIPTION OF THE DRAWINGS

FIG. 8 is a table relating to generation of shift schedules for a transmission.
FIG. 10 is a table relating to generation of shift schedules for a transmission.

DETAILED DESCRIPTION

Figure 1:
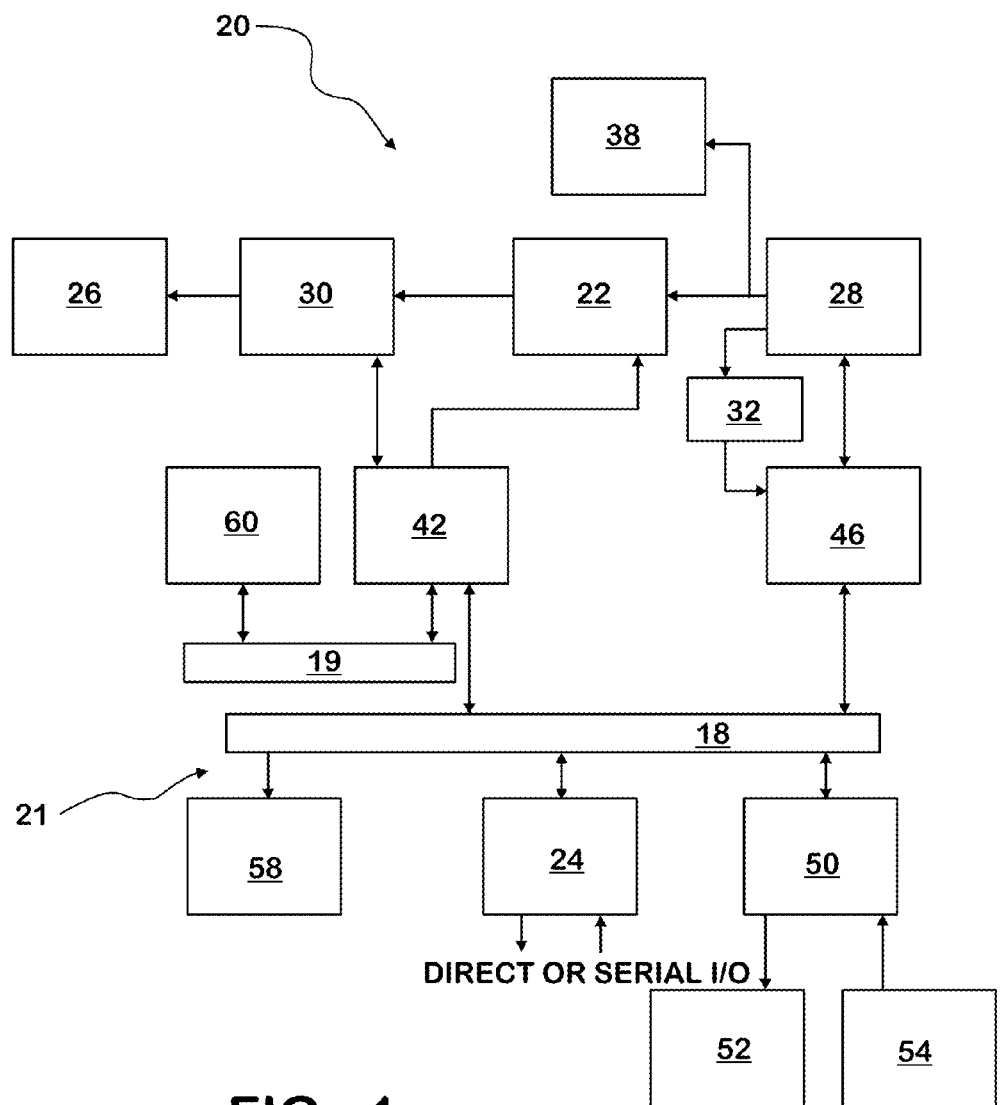
FIG. 1 is a high level schematic of a vehicle control system.

In the following detailed description, like reference numerals and characters may be used to designate identical, corresponding, or similar components in differing drawing figures. Furthermore, example sizes/models/values/ranges may be given with respect to specific embodiments but are not to be considered generally limiting.

Referring to FIG. 1, a high level schematic of a control system 21 for a motor vehicle is illustrated. An electrical system controller (ESC) 24, a type of a body computer, and several sub-system controllers exchange data and instructions over a public data-link 18. The sub-system controllers exercise direct control over various vehicle sub-systems such as its internal combustion (IC) engine 28, an auto-clutch 22, or a transmission 30. Data-link 18 is commonly the backbone of a controller area network (CAN) conforming to the Society of Automotive Engineers (SAE) J1939 standard.

Four major sub-system controllers exclusive of the ESC 24 are shown. These are coupled for communication, that is the exchange of data and commands, over public data-link 18. The illustrated sub-system controllers include an engine controller/control unit (ECU) 46, a transmission controller/control module (TCM) 42, a gauge cluster controller 58 and an anti-lock brake system controller (ABS) 50. It will be understood that other controllers may be connected to data-link 18. ABS controller 50, as is conventional, controls application of brakes 52 and receives wheel speed sensor signals from wheel speed sensors 54. Wheel speed may be averaged and reported over data-link 18 as vehicle speed which is monitored by transmission controller 42 and engine controller 46. TCM 42 may communicate with a gear selection mechanism such as a transmission push button controller 60 over a transmission dedicated data-link 19. The control architecture shown is illustrative only and not intended to limit possible control arrangements.

A vehicle drive train 20 is the primary object of operations of the control system 21. In vehicle drive train 20 the IC engine 28 can be connected to and detached from the automatic transmission 30 by an auto-clutch 22. The automatic transmission 30 is in turn is mechanically coupled to drive wheels 26. IC engine 28 is generally taken here to be a 4-stroke, diesel cycle engine. The automatic transmission 30 can be any one of a number types of automatic transmission.

A crankshaft position sensor 32 signal which is read directly by the ECU 40. This signal is used by the ECU 40 to develop an engine speed signal which it in turn reports it over public data-link 18 providing the function of a tachometer. Engine speed is one variable used to trigger gear changes in transmission 30 and is used to determine instantaneous parasitic load on the IC engine 28 which reduce available traction power to the drive wheels 26.

ESC 24 may also be directly or serially connected to external inputs and outputs (I/O). Inputs to ESC 24 may include control inputs relating to vehicle operation such as an ignition switch input, a brake pedal position input, an accelerator position sensor and a park brake position sensor input. Outputs can include control signals for external lights. External inputs to ESC 24 may also be taken to include operating condition related data such as geographic position, ambient temperature, density altitude, any one of which may trigger an ESC 24 command to the ECU 46 to derate the IC engine 28. External inputs may be further taken to include data accessed from look up tables by ESC 24. IC engine 28 may also be derated due to emergency or maintenance related condition indicated by such external inputs.

For purposes of this disclosure a vehicle transmission operational mode (for example performance mode or economy mode) may be taken to be exogenously provided. The transmission operational mode may be operator selected external input to ESC 24 or generated by ESC 24 in response to operator driving style. External inputs may also result in ESC 24 instructing an engine controller (ECU) 40 to derate the IC engine 28 which may drive the operational mode.

External inputs, as well as data signals received over datalink 18 such as engine speed, may also be used by the ESC 24 or the ECU 40 to determine the parasitic load on IC engine 28. As elaborated on below, parasitic loads may be engine speed dependent and highly variable over short periods of time. For example, an engine cooling fan, when engaged, may absorb up to 100 horsepower. Such a cooling fan has an increasing capacity to absorb power with increasing engine speed. Airconditioning compressors, pneumatic pumps, alternators, power take-off applications and the like are all possible direct parasitic loads on an engine which the ECU 40 or ESC 24 may be programmed to calculate.

Excluding continuously variable transmissions, most transmissions are built using a series of discrete gear ratios to couple output of the IC engine 28 to the drive wheels 26. The currently engaged gear changes successively to next higher gears during acceleration. For automated manual transmissions, as on a manual transmission, each gear has a fixed ratio relationship between vehicle speed and engine speed. Gear selection is executed by shift control logic (SCL) operating on transmission controller 42. SCL has used shift schedules generated by calculations of how much power and torque is available against engine speed and more particularly by comparisons of how available power and torque will change due a given shift. Shift schedules are developed from transmission parameters broadcast by the transmission controller 42 and dynamically adjusted based on changing engine operating conditions.

IC engine 28 torque and power output curves against engine RPM are generally represented as known quantities, however these are subject to change based on environmental conditions and vehicle operating conditions. Available power and torque can change substantially over short periods of time. In addition, the power and torque available to the drive wheels 26 may differ substantially from what is produced by the IC engine 28 and this to can change over time, sometimes abruptly.

Altitude is an example of an environmental condition which affects engine output. Above certain altitudes an engine may be derated by its ECM 46. Other conditions can result in dynamic derating of an engine. Engagement of operation of a cooling fan, represented here as a parasitic load 38 is an example of a vehicle operating condition which imposes a substantial load on IC engine 28 which results in a substantial reduction in available power to the drive wheels 26 without a change in engine power output. Cooling fans generally have a non-linear and increasing power consumption curve with increasing engine speed. Increases in engine speed during fan operation result in a downward displacement in the power available at any RPM and a lowering of the RPM at which peak power available to the drive wheels as compared to when the fan is disengaged. Employing a shift schedule developed for an engine operating under average conditions when a cooling fan is operating can result in shifts occurring later then they should occur to achieve maximum available performance and increase fuel consumption.

Vehicle performance for acceleration (change in speed (delta v) over time) is maximized by selective matching the current achieved gear in transmission 30 to power output of IC engine 28 in order to keep the IC engine 28 output as close as feasible around peak power output. Fuel economy (brake specific fuel consumption or BSFC) during acceleration is generally improved by operating the IC engine 28 at a high load and low speed. A shift schedule which emphasizes fuel economy over raw acceleration is oriented to shifts which keep the IC engine operating closer to peak torque output. Torque usually peaks at a lower engine speed than power and thus shifts during acceleration occur prior to peak power output. Varying terrain is an operational condition which can result in seeking or shift cycling, repeated shifts to and from gear, by a transmission controller. Upshift and downshift shift schedules may be generated to deal with such circumstances.

Fuel consumed by an internal combustion engine is often measured in Brake Specific Fuel Consumption (BSFC), currently understood in the art to mean:

$$\text{Fuel Consumed}/(\text{Brake Horsepower}*\text{time})$$

Or $$\text{Fuel Consumed}/\text{Gross Output Energy}$$

Engine control units have the ability to calculate the instantaneous BSFC through available engine data, and they have the capability to predict and map BSFC across the engines entire speed and load operating range.

An analogous concept to net power related to BSFC would be net BSFC or:

$$\text{Fuel Consumed}/(\text{wheel horsepower}*\text{time})$$

or $$\text{Fuel Consumed}/\text{Net Output Energy}$$

or $$\text{Fuel Consumed}/((\text{Brake horsepower}-\text{losses})*\text{time})$$

Net BSFC would be based around the power available to actually drive the vehicle forward rather than gross output. In general, this will make clearer the benefits of operating a vehicle in conditions of low parasitic losses (fan, alternator, power steering pump). Friction would not factor into this calculation as it is already included in the gross BSFC number.

While power ratios are the first approach discussed here, transmission shifting directed to an operational mode emphasizing reduced fuel consumption based on calculated BSFC maps can be used to create a BSFC Ratio to command transmission shifting. BSFC ratio would provide a direct correlation between transmission gear and engine fuel consumption. The power ratio approach is, in comparison, a more heuristic or indirect method. However, the flow of information and associated hardware remains unchanged if BSFC is used instead of power ratios during economy mode operation.

Figure 2:
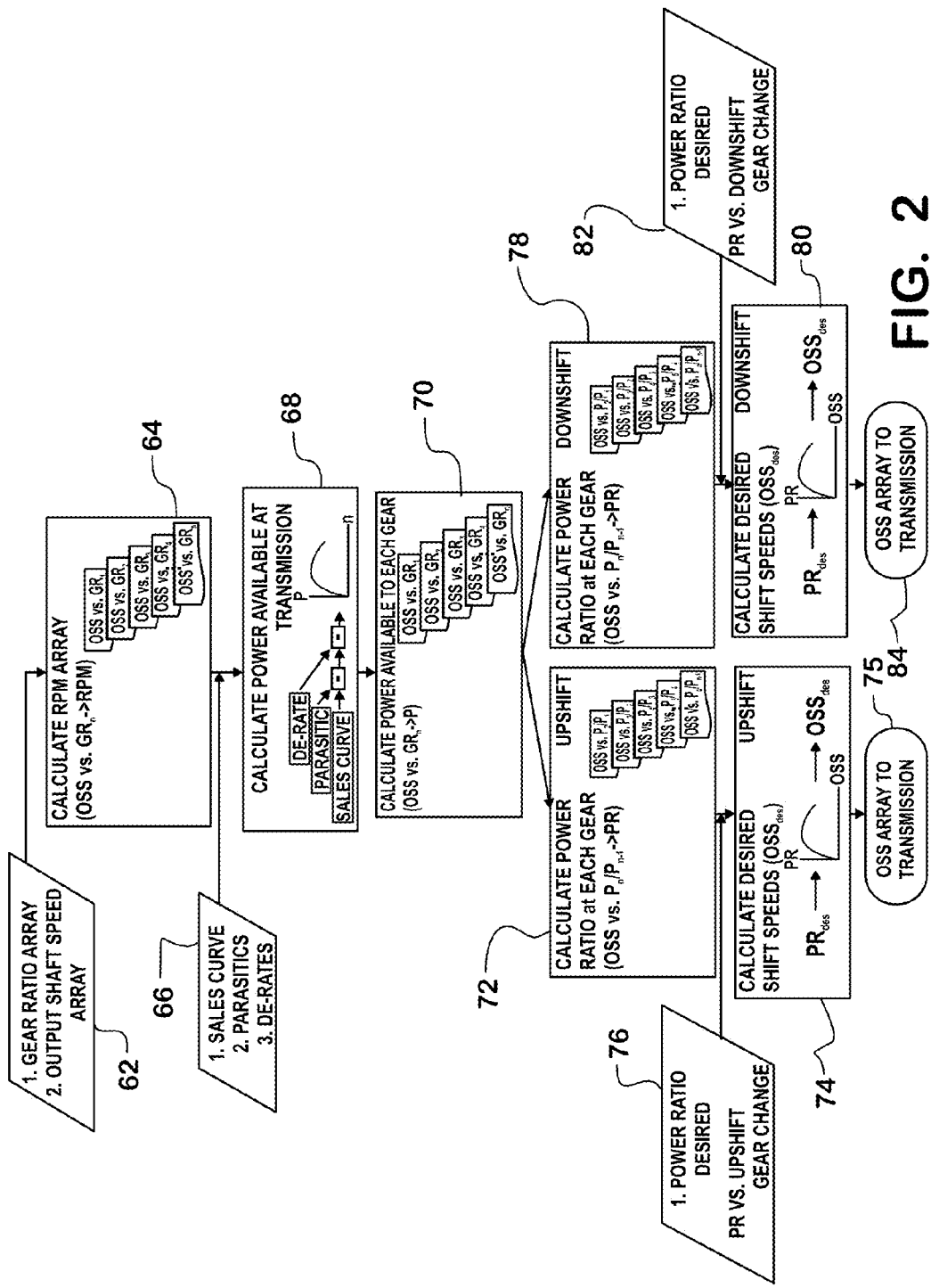
FIG. 2 is a high level flow chart of an algorithm for generating shift schedules.

Referring now to FIG. 2, a flow chart illustrates ECU 46 generation of upshift and downshift shift schedules for use by the transmission controller 42. The process of the flow chart is executed repeatedly during vehicle operation. Step 64 reflects access to the gear ratio array and output shaft speed array (block 62) by a vehicle by an engine RPM array calculation step 64. Next the power available to transmission 30 is calculated at step 68. This is determined by subtracting parasitic losses and derate limitations from the power curve. These values are available from a lookup table 66. Next, at step 70, a series of output power curves from the transmission 30 for each gear in the transmission is calculated. From this calculation it is possible to determine "power ratios" which will be used to dynamically develop shift schedules for the transmission controller 42. For economy mode operation based on BSFC, BSFC maps would exist for each gear. These maps would take into account the same parasitic, pumping losses, and derates as the power available maps. BSFC desired arrays are provided for shift up and down gear change.

Essentially the power ratio is the ratio of power available to the drive wheels 26 at each of two possible engaged gears. For example, during upshifting the engaged gear generally progresses from a lower ratio gear to the next higher ratio gear. The power available to the drive wheels 26 at the higher ratio gear (power after shift or Pa) is compared to the power available to the drive wheels at the lower ratio gear (power before shift or Pb):

$$Pa/Pb = \text{Power Ratio (Pr)}$$

From the foregoing it should be clear that the power ratio Pr changes at given engine rpms with changes in parasitic loads and engine operating conditions.

Steps 72 and 78 reflect generation of upshift and downshift shift schedules, respectively, generated by developing the power ratios at each gear. Following steps 72 and 78 exogenous performance criteria are provided (inputs 76 and 82) and a shift schedule is generated for upshifting and downshifting (steps 74 and 80). Steps 75 and 84 reflect transmission of the shift schedules from ECU 46 to the transmission controller 42.

Figure 3:
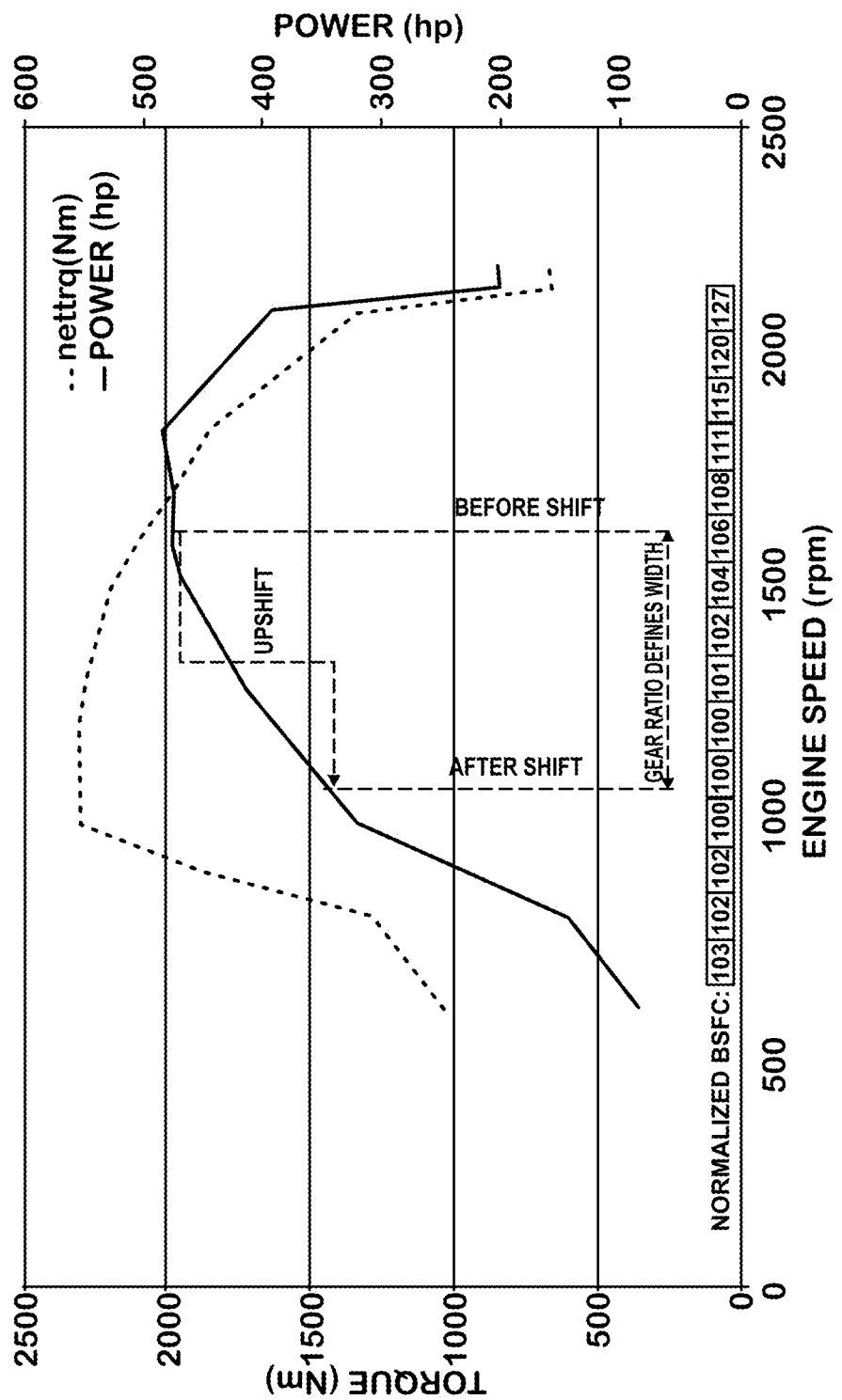
FIG. 3 is a graph of power versus engine speed.

Referring now to FIG. 3, power and torque curves against rpm are illustrated showing a hypothetical shift calculated to minimize fuel usage per distance traveled while accelerating to a target speed. Before and after shift engine speeds are targeted to yield a power ratio (Pr) of 0.8 or compared to a BSFC map.

Figure 4:
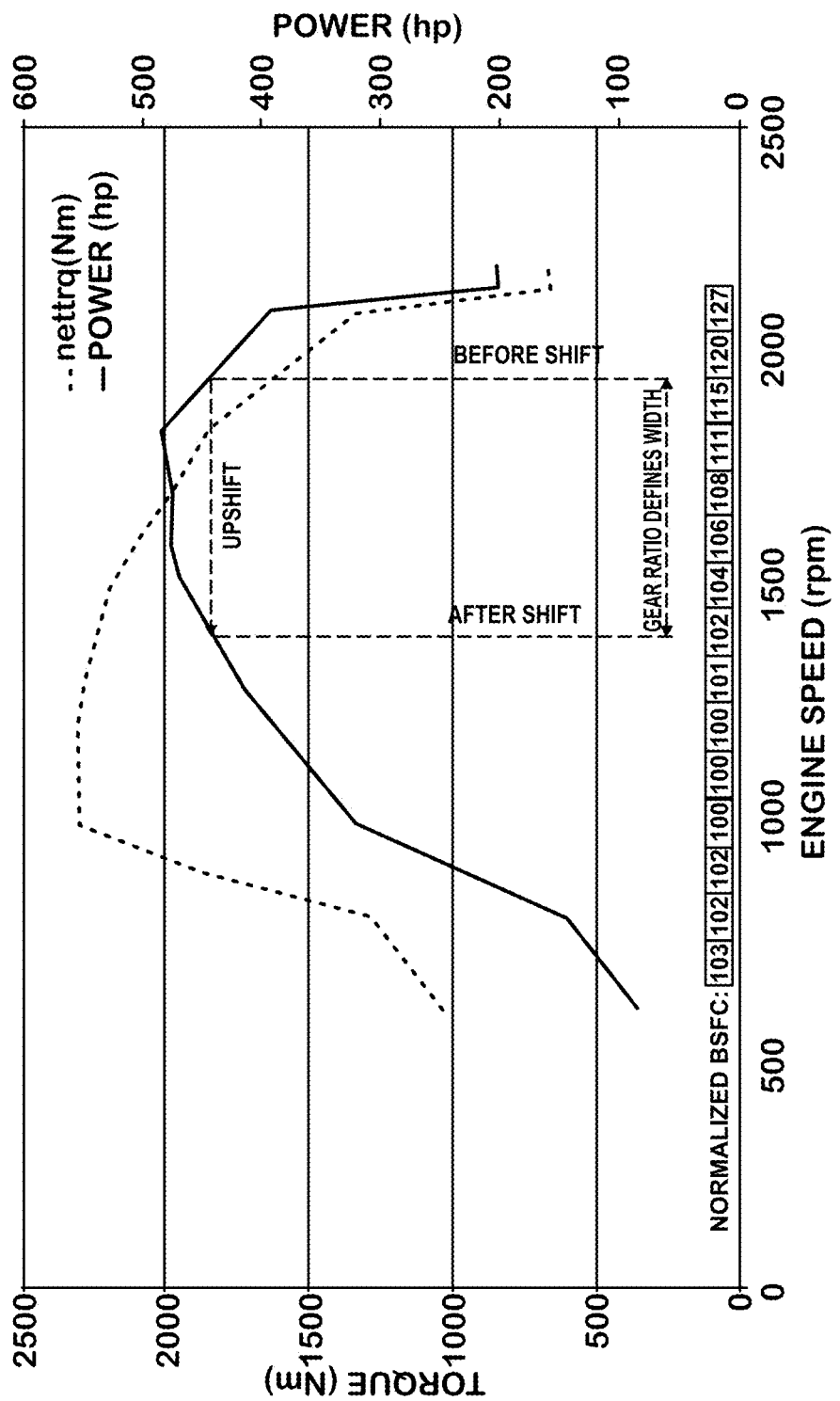
FIG. 4 is a graph of power versus engine speed.

Referring now to FIG. 4, power and torque curves against rpm are illustrated showing a hypothetical shift calculated to maximize acceleration to a target speed. Before and after shift engine speeds are targeted to yield a power ratio (Pr) of 1.0.

Figure 5:
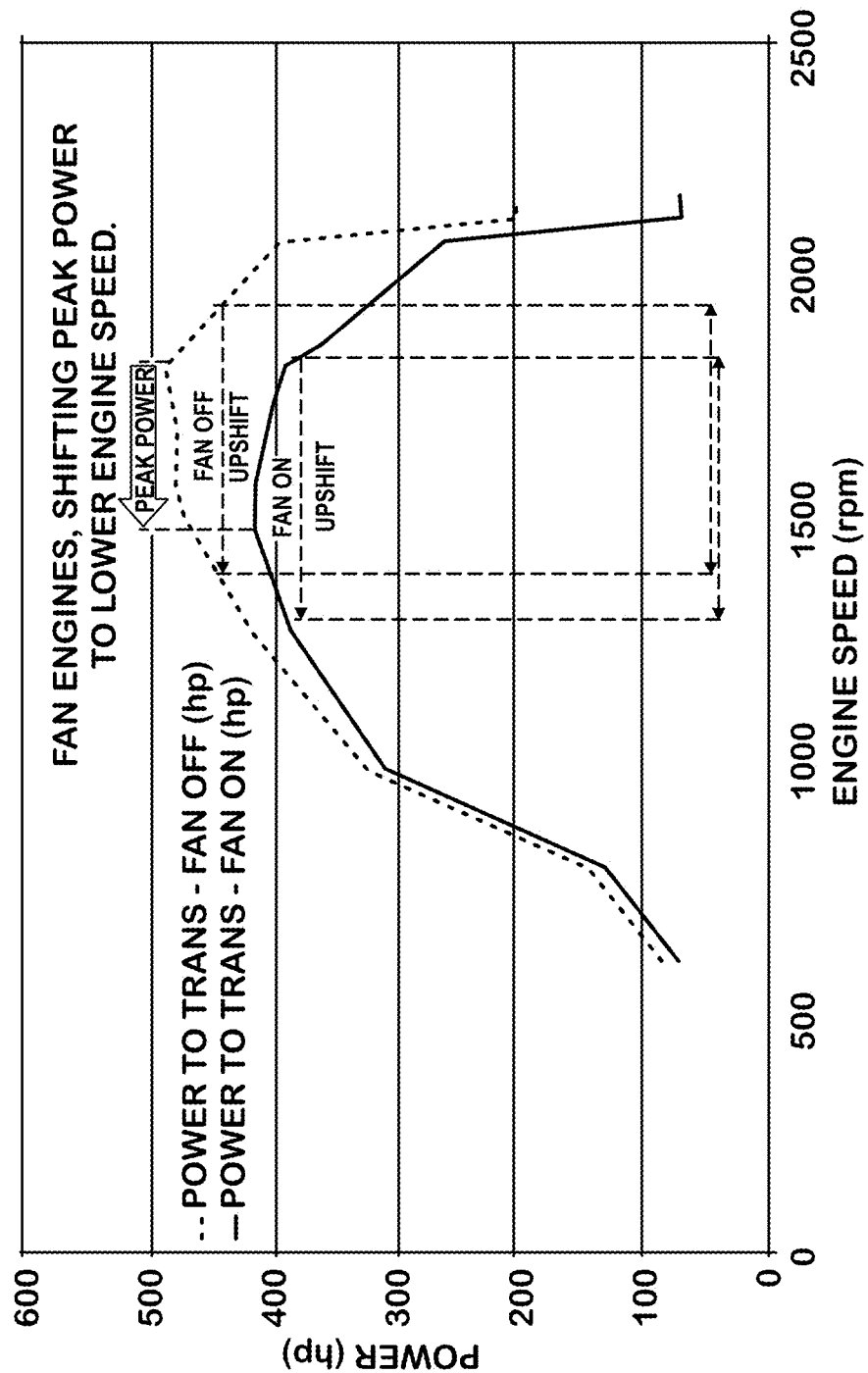
FIG. 5 is a graph of power versus engine speed.

Referring now to FIG. 5, power and torque curves against rpm available for propulsion are illustrated showing a the effects of engaging and disengaging a fan. The consequences for an upshift are illustrated as moving to lower engine rpms to maintaining a power ratio (Pr) of 1.0 used to maximize acceleration.

Figure 6:
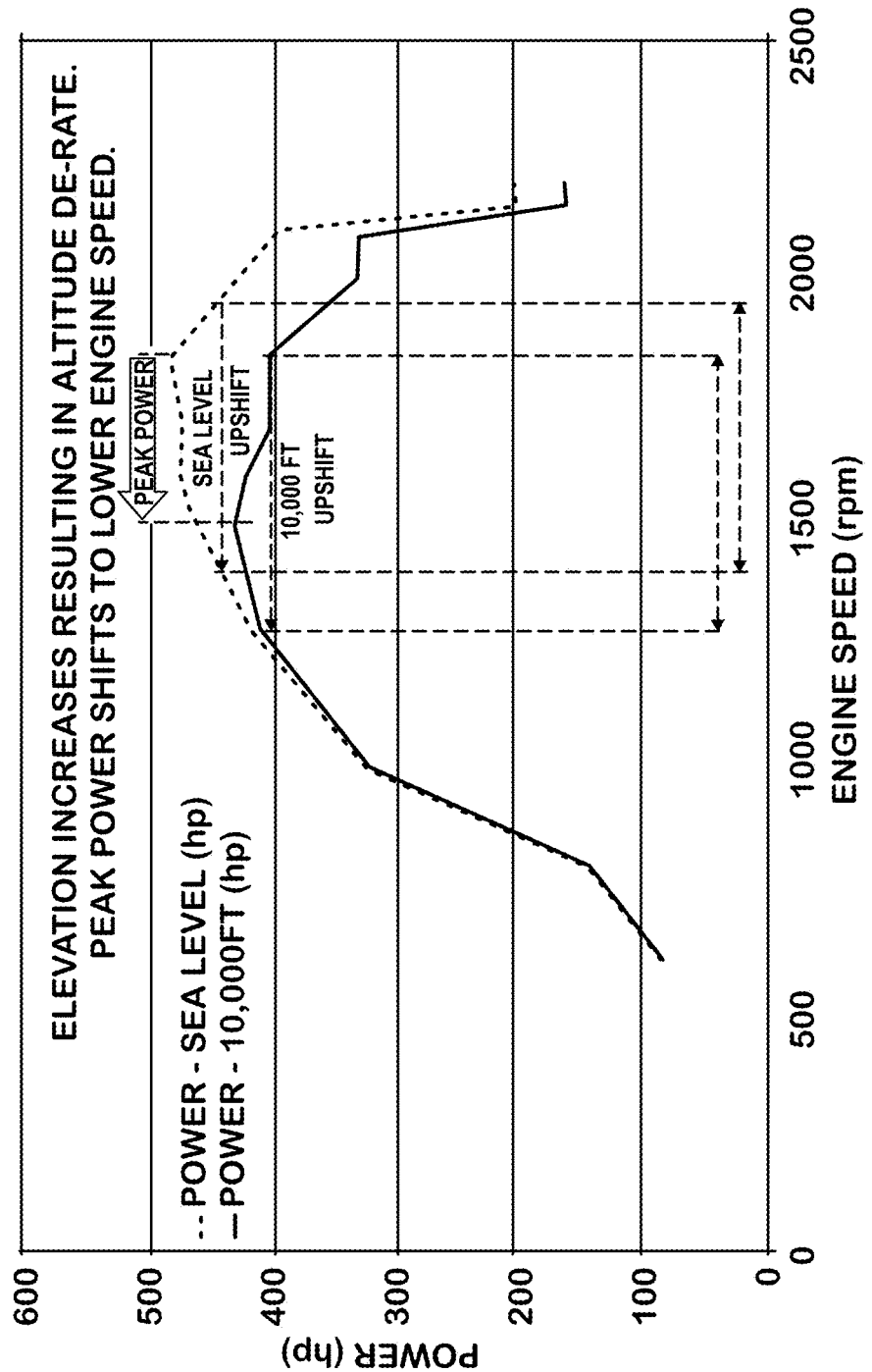
FIG. 6 is a graph of power versus engine speed.

Referring now to FIG. 6, power and torque curves against rpm available for propulsion are illustrated showing a the effects of an increase in elevation producing an altitude de-rate of an engine. The consequences for an upshift are illustrated as moving to lower engine rpms to maintain a power ratio (Pr) of 1.0 used to maximize acceleration.

Figure 7:
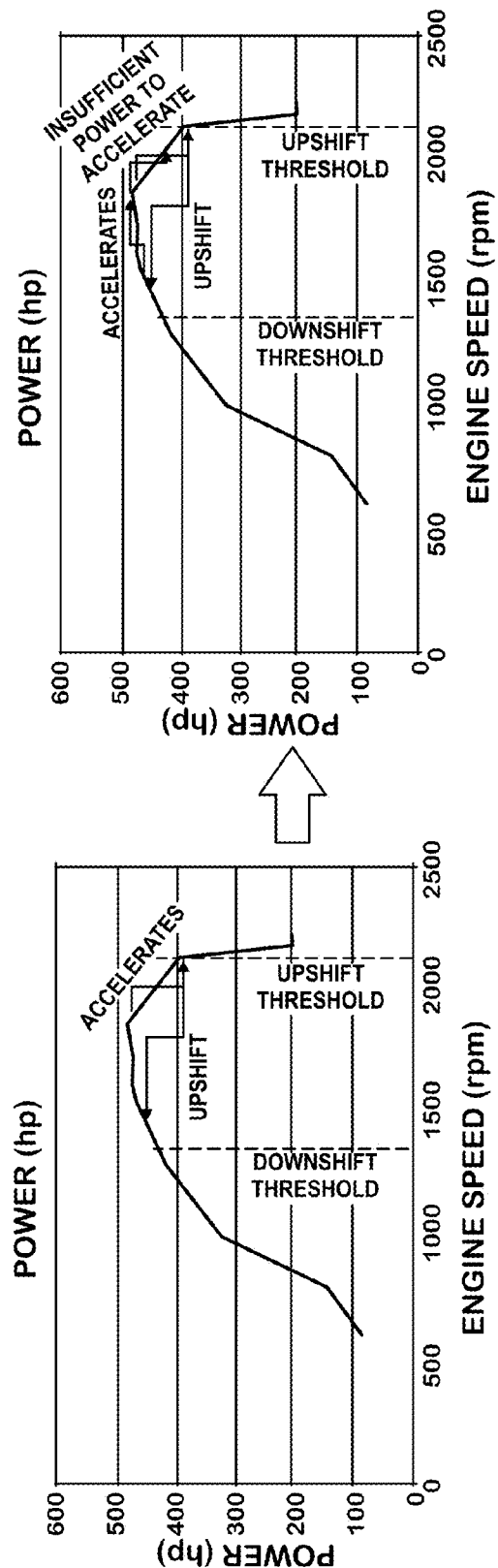
FIG. 7 are graphs of power versus engine speed.

Referring now to FIG. 7, a upshift hold situation, typical of the situation during hill climbing, is illustrated. Power and torque curves against rpm available for propulsion are illustrated The power ratio (Pr) is held above 1.0 to prevent shift cycling. Since there is more power available in the higher gear after the shift the vehicle accelerates despite the high road load. Because power drops off before upshift speed, upshift speed is not achieved. No shift cycling occurs.

Figure 9:
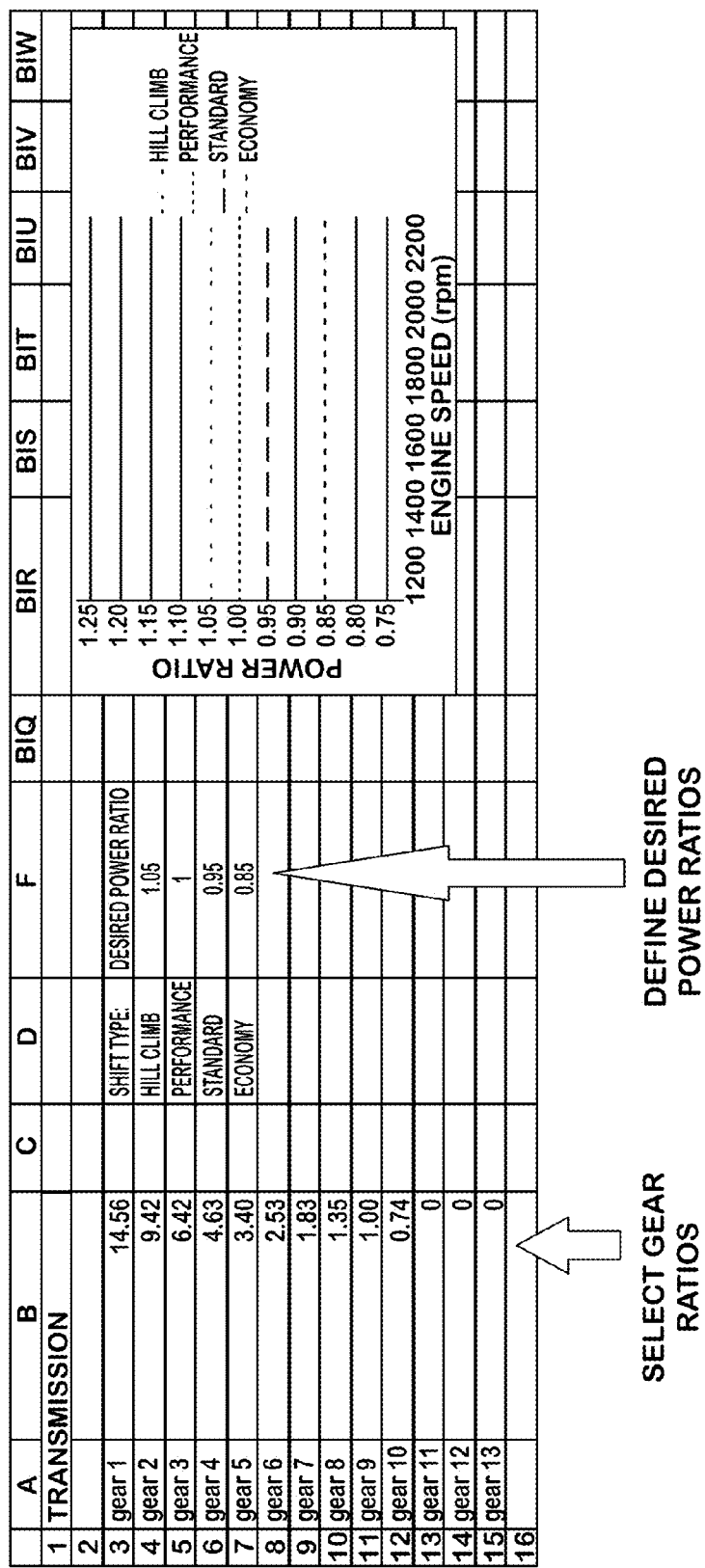
FIG. 9 is a table relating to generation of shift schedules for a transmission.
Figure 11:
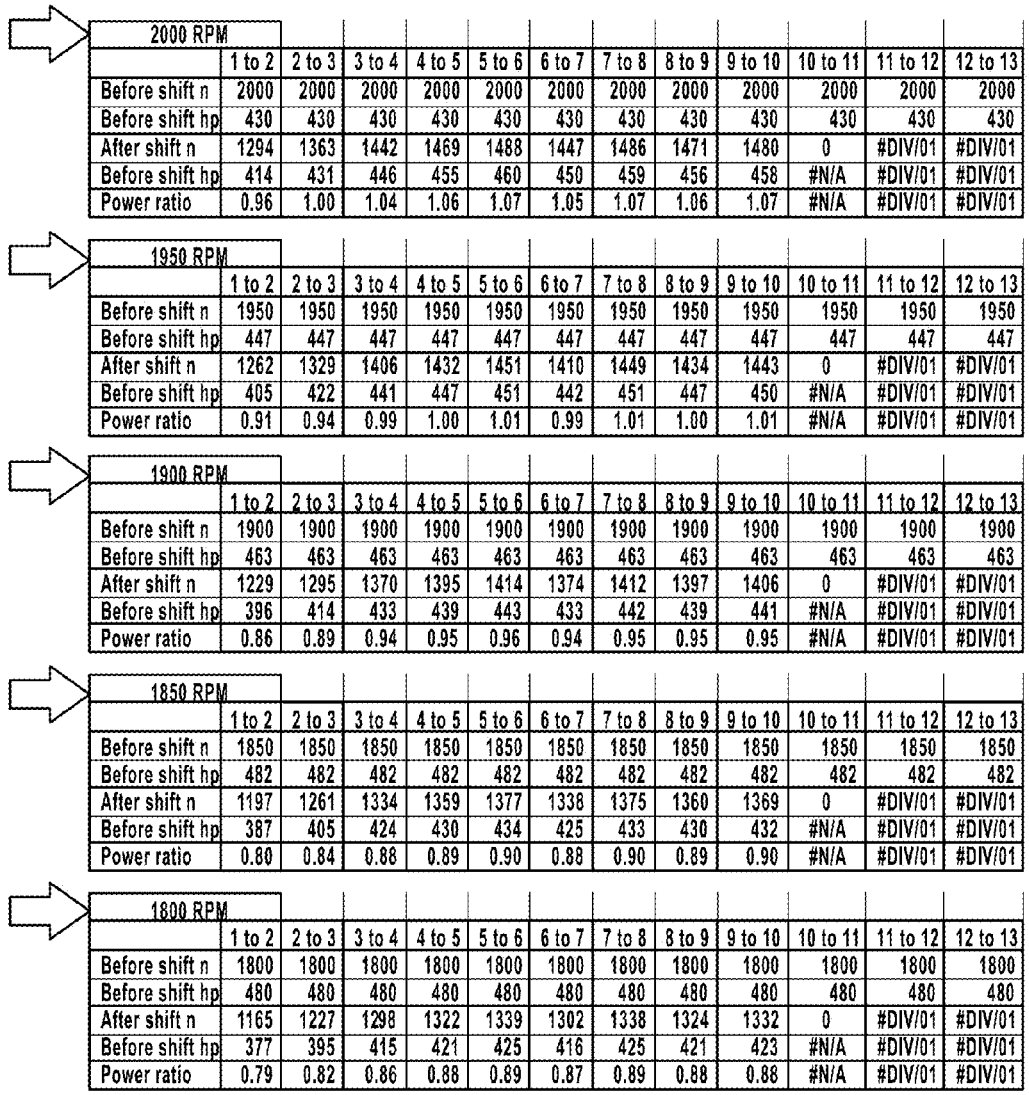
FIG. 11 is a table relating to generation of shift schedules for a transmission.
Figure 12:
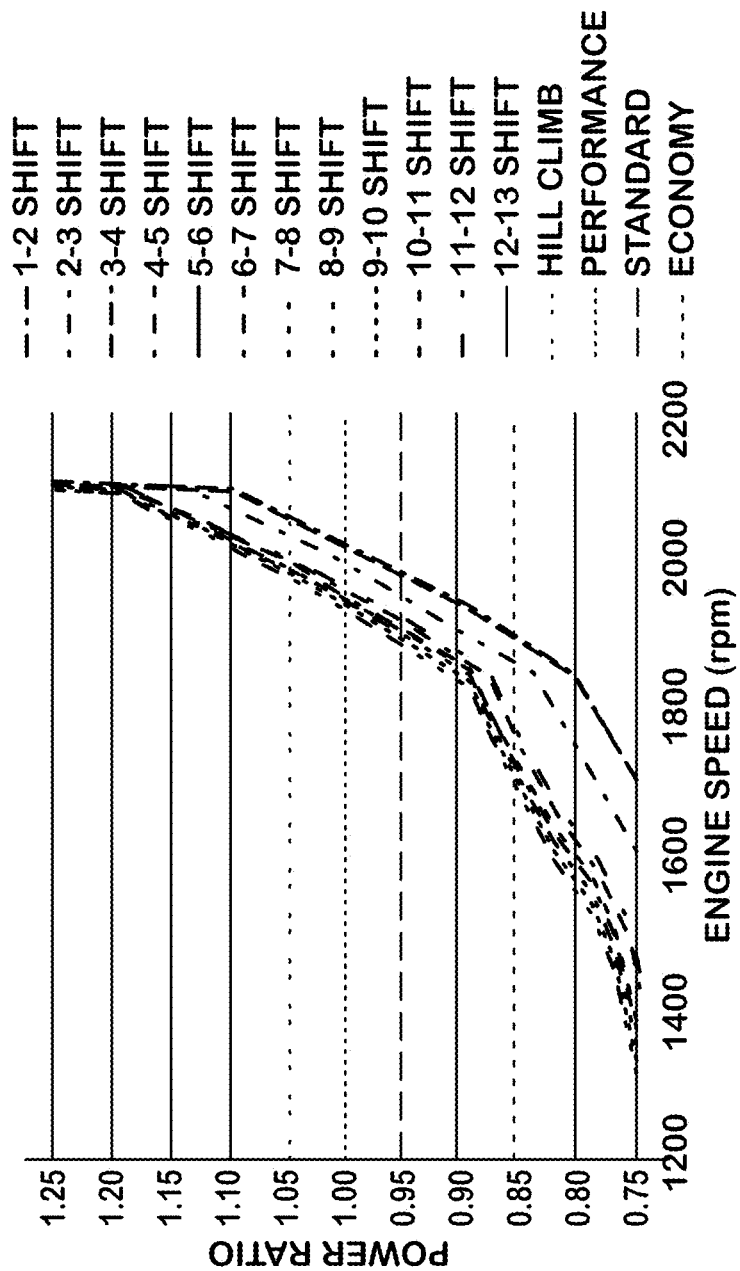
FIG. 12 is a graphical illustration of a representative set if shift schedules.

FIGS. 8-12 illustrate generation of shift schedules. FIG. 8 reflects generation of a high resolution set of data points for engine power and torque against engine speed. FIG. 9 reflects data inputs including four performance settings defined in terms of power ratios (Pr) for the transmission controller 42. The performance settings are characterized as economy, standard, performance and hill climbing. Values for a gear ratio look up table are provided. FIG. 10 gives representative power ratio shift schedules for the performance categories. FIG. 11 deals with shift schedules modified due to transmission constraints. Implicitly the shift schedule generation method disclosed is adaptable to a variety of transmissions. Engine speed based schedules are substituted for power ratios. Finally, FIG. 12 is a plot of a representative set of shift schedules for a vehicle.

What is claimed is:

1. A method of controlling a plurality of gears of a transmission of a vehicle by generating shift schedules, the vehicle including a vehicle speed sensor and an engine speed sensor, the method comprising:
    using an engine controller for providing a plurality of a transmission operational modes categorized by ratios of available traction power after a transmission gear shift compared to available traction power before the transmission gear shift;
    determining available traction power for each of the plurality of gears over a range of engine speeds including adjusting for parasitic losses; and
    generating a shift schedule for shifts between gears of the transmission for at least a first transmission operational mode in terms of ratios of available traction power before and after gear shifts;
    transmitting the generated shift schedule to a transmission controller; and
    using the transmission controller to implement the generated shift schedule for controlling the shifting between gears of the transmission.

2. The method of claim 1, further comprising:
    responsive to indication of transmission limitations, the engine controller substituting engine speed shift points for ratios of available traction power.

3. The method of claim 1, wherein determining available traction power further includes adjusting for dynamic derating of the engine.

4. The method of claim 1, further comprising: periodically repeating the steps of determining and generating.

5. The method of claim 1, further comprising: responsive to an exogenously established operational mode directed toward minimizing fuel consumption, the engine controller substituting shift points based on brake specific fuel economy less parasitic losses for ratios of available traction power.

6. The method of claim 3, the transmission operational modes including a mode in which the power ratio is greater than 1 to prevent shift cycling.

7. Apparatus for controlling shifting on a vehicle transmission, the apparatus comprising:
    an engine controller;
    a transmission controller;
    at least one sensor for generating measurements of engine speed;
    a plurality of exogenously provided transmission operational modes categorized by ratios of available traction power after a transmission gear shift compared to available traction power before the transmission gear shift; wherein;

the engine controller is used for determining available traction power for each of the plurality of gears over a range of engine speeds including adjustments for parasitic losses;

generating a shift schedule between gears of the transmission for at least a first transmission operational mode in terms of ratios of available traction power before and after gear shifts; and communicating the shift schedule to the transmission controller and wherein;

the transmission controller controls the shifting on the vehicle transmission.

8. The apparatus of claim 7, wherein the engine controller, responsive to indication of transmission limitations, substitutes engine speed shift points for ratios of available traction power.

9. The apparatus of claim 7, wherein the engine controller determining available traction power is further responsive to dynamic derating of the engine.

10. The apparatus of claim 7, wherein the plurality of exogenously provided transmission operational modes include one which the power ratio is greater than 1.

11. The apparatus of claim 7, wherein the engine controller is further used for generating a shift schedule between gears of the transmission for a transmission operational mode in terms of brake specific fuel consumption less parasitic losses before and after gear shifts.

\* \* \* \* \*